United States Patent [19]
Cosstick et al.

[11] Patent Number: 6,166,114
[45] Date of Patent: Dec. 26, 2000

[54] FIRE AND ELECTRICAL RESISTANT COMPOSITIONS

[75] Inventors: Kevin Bodle Cosstick, Geneva, Switzerland; Robert Valentine Kasowski, West Chester, Pa.

[73] Assignee: E. I. du Pont de Nemours and Company, Wilmington, Del.

[21] Appl. No.: 09/133,259

[22] Filed: Aug. 13, 1998

[51] Int. Cl.[7] .................................. C08J 3/20; C08K 5/34; C08K 5/52; C08L 67/00; C08L 5/04
[52] U.S. Cl. ........................ 524/100; 524/127; 524/400; 524/405; 524/414; 524/449
[58] Field of Search ..................... 524/100, 127, 524/405, 414, 400, 449

[56] References Cited

U.S. PATENT DOCUMENTS

| | | |
|---|---|---|
| 3,458,470 | 7/1969 | Edgar . |
| 3,936,416 | 2/1976 | Brady . |
| 4,298,518 | 11/1981 | Ohmura et al. . |
| 4,678,607 | 7/1987 | Reitz ........................................ 252/609 |
| 5,021,484 | 6/1991 | Schreiber et al. ....................... 524/100 |
| 5,028,347 | 7/1991 | An et al. ............................... 252/62.54 |
| 5,149,735 | 9/1992 | Bressan et al. ......................... 524/450 |
| 5,618,865 | 4/1997 | Martens et al. ......................... 524/100 |
| 5,639,800 | 6/1997 | von Bonin et al. ..................... 521/103 |
| 5,643,980 | 7/1997 | Shindoh et al. ......................... 524/100 |
| 5,674,947 | 10/1997 | Oishi et al. ............................. 525/289 |
| 5,708,065 | 1/1998 | Martens et al. ......................... 524/100 |

FOREIGN PATENT DOCUMENTS

| | | |
|---|---|---|
| 0 877 048 A2 | 11/1998 | European Pat. Off. . |
| 2 130 793 | 1/1973 | Germany . |
| 2 150 484 | 5/1973 | Germany . |
| 30 23 965 A1 | 2/1981 | Germany . |
| WO 97/23565 | 7/1997 | WIPO . |
| WO 97/31056 | 8/1997 | WIPO . |
| WO 98/45364 | 10/1998 | WIPO . |
| WO 99/41309 | 8/1999 | WIPO . |

OTHER PUBLICATIONS

Anne E. Lipska, *WSCI*, 1–39, 1973.

*Primary Examiner*—Patrick D. Niland

[57] ABSTRACT

This invention relates to polyester and polyamide compositions which contain a flame retardant, one or more alkaline earth metal salts, and a reinforcing agent. The flame retardant includes a melamine phosphate compound. Addition of at least one alkaline earth metal salt maintains the physical properties and the electrical properties of the resin composition, which degrade upon addition of melamine or melamine salts, while retaining the desired flame retardancy.

8 Claims, No Drawings

FIRE AND ELECTRICAL RESISTANT COMPOSITIONS

FIELD OF THE INVENTION

This invention relates to polyester and polyamide resin compositions which have a combination of good physical properties, fire resistance, and electrical resistance.

BACKGROUND OF THE INVENTION

Synthetic resins, including polypropylene, polycarbonate, polystyrene, polyesters and aliphatic polyamides, such as nylon-6,6 and nylon-6, and copolymers and blends thereof, are often used for molded articles and fibers. In many uses, particularly for molded articles, it is preferred that the resin have improved resistance to fire, compared to the resin alone. This is often attained by the addition of various agents which improve the basic fire resistance of the resin, but sometimes these agents degrade or diminish other physical properties of the resin, such as electrical resistance, tensile strength, and elongation. Since resins are widely used, compositions which have improved fire resistance but yet retain the desirable physical properties of the resin are constantly being sought.

German Patents 2,150,484 and 2,130,793, and A. E. Lipska, Comb. Inst. Arizona State Univ., West. State Sect. Combust. Inst. WSCI, 1973, report that certain tungsten compounds can be used in various ways to improve the fire resistance of polyamides. The combinations of agents described hereinafter are not disclosed in these references.

U.S. Pat. No. 4,298,518 discloses compositions containing polyamides and melamine cyanurate, which are said to have good fire resistance.

U.S. Pat. No. 3,458,470 discloses compositions containing polyamides and a variety of tungsten or molybdenum compounds, including silico- and phospho-tungstic acids. These compositions are said to have good resistance to discoloration and be stable to light. U.S. Pat. No. 3,936,416 discloses that polystyrene (PS), polypropylene (PP), and polyethylene (PE) are flame proofed by combination of melamine pyrophosphate (MPP) and dipenterythritol, but requires a 45% loading of the total resin plus flame retardant composition.

Melamine phosphate may be added to synthetic resins to improve the flame retardancy of the resins, but when heated to normal engineering polymer processing temperatures the melamine phosphate reacts so that the resultant mixture of the resin and the melamine phosphate has very poor physical properties.

U.S. Pat. No. 5,618,865 discloses compositions containing polyesters or polyamides, reinforcing agents, and certain flame retardant compositions of melamine phosphate or melamine pyrophosphate; however these compositions have poor electrical properties. An important measure of the electrical properties of a resin composition is the Comparative Tracking Index (CTI). When a voltage is applied across the surface of compositions such as those in U.S. Pat. No. 5,618,865, the samples can catch fire and cause tracking as measured by CTI. Although the melamine phosphates add flame resistance, they degrade CTI unacceptably. In U.S. Pat. No. 5,708,065, compositions of polyesters or polyamides and zinc borate are used with melamine phosphates to improve CTI to an acceptable value. However, processing such compositions is difficult and flame retardancy is reduced. Samples with zinc borate made according to U.S. Pat. No. 5,708,065 have shown unacceptable mechanical properties and attempts to prepare such compositions on commercial scale large machines has proved elusive.

What are needed, therefore, are flame retardant resin compositions with acceptable electrical properties which do not have the problems and deficiencies of the prior art, and particularly compositions with mechanical properties that are not significantly reduced by the addition of flame retardants and other desirable additives.

SUMMARY OF THE INVENTION

The present invention concerns a composition, comprising: (a) about 30 to about 70 weight percent of a polyester or a synthetic, aliphatic polyamide, or a mixture thereof; (b) about 15 to about 40 weight percent of a reinforcing agent; (c) about 5 to about 45 weight percent of a flame retardant comprising at least one melamine phosphate compound selected from the group consisting of: melamine phosphate, melamine polyphosphate, and melamine pyrophosphate; and (d) about 0.5 to about 12 weight percent of one or more salts of one or more alkaline earth metals; wherein all percents by weight are based on the total weight of (a)+(b)+(c)+(d) only.

DETAILED DESCRIPTION

The composition described herein is a resin composition having both good physical properties, good flame retardancy, and good electrical properties. The composition has four components (1) a polyester or a synthetic, aliphatic polyamide or a mixture thereof; (2) a reinforcing agent; (3) a flame retardant which includes a melamine phosphate compound, which compound can be optionally doped with a charring catalyst, or a charring catalyst and a char former, or melamine cyanurate, or melamine; and (4) one or more salts of one or more alkaline earth metals. The present composition may include other minor ingredients. The addition of alkaline earth metal salts to flame retardant resin compositions serves to raise the CTI from about 350V to about 600V; enable the amount of melamine phosphate compound to be reduced; improve mechanical properties, and enable processing on large machines at commercially acceptable rates.

The first component of the present compositions is a polyester or a synthetic, aliphatic polyamide or a mixture thereof, which is present in an amount of about 30 to about 70 weight percent of the composition.

"Polyester" as used herein includes polymers having an inherent viscosity of 0.3 or greater and which are, in general, linear saturated condensation products of glycols and dicarboxylic acids, or reactive derivatives thereof. Preferably, they will comprise condensation products of aromatic dicarboxylic acids having 8 to 14 carbon atoms and at least one glycol selected from the group consisting of neopentyl glycol, cyclohexane dimethanol and aliphatic glycols of the formula $HO(CH_2)_nOH$ where n is an integer of 2 to 10. Up to 50 mole percent of the aromatic dicarboxylic acids may be replaced by at least one different aromatic dicarboxylic acid having from 8 to 14 carbon atoms, and/or up to 20 mole percent may be replaced by an aliphatic dicarboxylic acid having from 2 to 12 carbon atoms.

The most common polyester compositions are based on polyethylene terephthalate homopolymers, polybutylene terephthalate homopolymers, polyethylene terephthalate/polybutylene terephthalate copolymers, polyethylene terephthalate/polybutylene terephthalate mixtures and mixtures thereof, although other polyester may be used as well, alone, in combination with each other, or in combination with those polyesters listed above.

"Synthetic polyamide", as used herein, includes a polymer which is made by man, and does not include natural fibers such as wool or silks. By an "aliphatic polyamide" is meant a polymer which has repeat units which include amide groups in the main chain, and in which at least some, preferably at least 50 mole percent, of these amide groups (through the nitrogen atoms and/or carbonyl carbon atoms of the amide groups) are connected to aliphatic carbon atoms. Preferred polyamides include nylon-6,6, nylon-6, nylon 6,12, and copolymers of nylon-6,6 and nylon 6. Nylon-6,6 and nylon-6, and copolymers thereof, are especially preferred and nylon-6,6 is more preferred.

Mixtures or blends of polyesters and synthetic polyamides may also be used. Up to about 40 wt % of the polyester may be replaced by a polyamide. Preferably, from about 5 to about 30 wt % of the polyester may be replaced by the polyamide. In a preferred embodiment of a polyester/polyamide blend, the polyester is polybutylene terephthalate and the polyamide is nylon-6,6.

The second component in the composition of the present invention is a reinforcing agent, such as a glass or mineral reinforcing agent, and can include glass, carbon, mica and/or aramid fibers or fibrids. The reinforcing agent, which is present in an amount of about 15 to about 40 weight percent, is important in obtaining good physical properties.

The third component of the composition of the present invention is a flame retardant that comprises at least one melamine phosphate compound. In certain embodiments, the melamine phosphate compound is doped with a charring catalyst or with a charring catalyst and a char former, or with melamine, or with melamine cyanurate.

The melamine phosphate compound is herein defined to include melamine phosphate ($C_3H_6N_6.HPO_3$), melamine polyphosphate ($C_3H_6N_6.HPO_3)_n$, where n>2, and melamine pyrophosphate (($C_3H_6N_6)_2.H_4P_2O_7$) or a mixture of any of the melamine compounds defined herein. Melamine polyphosphate is prepared by heating melamine pyrophosphate under nitrogen at 290° C. to constant weight. Melamine pyrophosphate is available commercially as melamine pyrophosphate from Hummel Croten, South Plainfield, N.J. or can be synthesized in accordance with U.S. Pat. No. 3,914,193. Melamine phosphate is available commercially from Albright and Wilson, Charlestown, S.C.

The flame retardant component can contain about 5 to about 45 weight percent of the melamine phosphate compound, preferably about 25 to about 45 weight percent for UL-94 V-0 ratings at 1/32", based on the total weight of the inventive composition. When less than 15 weight percent of the melamine phosphate compound is present, the composition is not effective as a flame retardant under UL94. However, lower amounts of the flame retardant may be effective under a flame retardant test less stringent that UL94, such as the glow wire test of International Standard IEC 695-2-1/0 1994. For synthetic polyamides, the upper amount of the melamine phosphate compound is about 36 weight percent, because while it may be possible to use greater that 36 weight percent of a melamine phosphate compound, such amounts are not deemed to be practical because of the high costs of using such an amount of the melamine phosphate compound. However, even greater amounts of the melamine phosphate compound may be used, especially when a polyester is used. Additionally, the flame retardant of the present invention may further comprise up to about 10 weight percent of one or more of the following: a charring catalyst, a charring catalyst and a char former, melamine cyanurate, and melamine.

By "melamine compound doped with a charring catalyst" is meant a melamine phosphate compound such as melamine pyrophosphate that is made such that the charring catalyst is bound to the melamine pyrophosphate. The melamine compound doped with a charring catalyst may be made by preparing an aqueous solution of melamine, preparing an aqueous solution of silicotungstic acid or phosphotungstic acid, and preparing an aqueous solution of a phosphorous compound, such as pyrophosphoric acid or polyphosphoric acid. The tungstic acid solution is added to the phosphorous solution, and then that mixture is added to the melamine solution. The resulting solution is vacuum dried to produce the doped melamine phosphate compound. The mole ratio of the melamine to phosphorous in the solution should be from 2:1 to 1:2. The number of moles of the charring catalyst should be from 0.01 to 0.5 moles per mole of melamine phosphate compound, and preferably 0.1 moles per mole of melamine compound. There may not be a 100% yield of melamine phosphate compound.

The melamine compound that is doped with a charring catalyst may also be made by contacting, in an aqueous medium, melamine and silicotungstic acid or phosphotungstic acid in a molar ratio of from about 1 to about 24 moles of melamine per mole of the tungsten compound to prepare "melamine salts" of the tungstic acids. It is preferred that the contacting be carried out at about 50° C. to about 100° C. It is believed that the melamine not only forms salts with the tungsten compound used, but also solvates the resulting salt much like water forms hydrates. Cyanuric acid may also be present so that the melamine forms a "mixed salt" with cyanuric acid and the silico- or phosphotungstic acid.

When melamine pyrophosphate is used as the melamine phosphate compound, the presence of the charring catalyst is not essential to the invention, but its use in conjunction with melamine pyrophosphate can reduce the amount of melamine pyrophosphate needed.

As used herein, the term "charring catalyst" includes a metal salt of a tungstic acid or a complex oxide acid of tungsten and a metalloid, a tin oxide salt such as sodium tin oxide, and/or ammonium sulfamate. Preferred metal salts include alkali metal salts of a tungstic acid, with sodium tungstate being especially preferred. By a complex oxide acid of tungsten and a metalloid is meant a complex oxide acid formed by a metalloid such as phosphorous or silicon and tungsten. Preferred complex oxide acids include silicotungstic acid and phosphotungstic acid, with silicotungstic acid being especially preferred. If the charring catalyst is present as part of the flame retardant component of the inventive composition it is present in an amount up to about 10 weight percent based on the total weight of the inventive composition. A preferred range is from about 0.1 to about 10 weight percent, with a more preferred range being from about 0.1 to about 2 weight percent.

Another optional ingredient of the inventive composition that is part of the flame retardant is a char former such as a polyhydric alcohol. Other examples include novolac, vinyl alcohols and starches. In the present invention, it is preferred that the polyhydric alcohol be penterythritol or dipenterythritol. If it is present in the composition, the char former is present in amounts of up to 10 weight percent based on the total weight of the inventive composition. A preferred range is from about 0.1 to about 10 weight percent, with a more preferred range being from about 0.1 to about 2 weight percent.

It has also been discovered that for compositions that include a synthetic, aliphatic polyamide, an alkaline earth metal salt, and a glass or mineral reinforcing agent, melamine pyrophosphate alone is effective as a flame retardant to obtain UL-94 V0 if used in a proportion of about 25 to about 30 weight percent. As discussed above, an amount of melamine pyrophosphate of about 5 weight percent or above may be effective to pass a less stringent flame retardant test such as the glow wire test.

It has also been discovered that for compositions that include a polyester, an alkaline earth metal salt, and a glass or mineral reinforcing agent, melamine pyrophosphate alone is effective as a flame retardant under UL-94 if used in a proportion of about 25 to about 45 weight percent. As discussed above, an amount of melamine pyrophosphate of about 5 weight percent or above may be effective to pass a less stringent flame retardant test such as the glow wire test.

Still other optional ingredients of the inventive composition that are part of the flame retardant are melamine cyanurate and melamine.

The fourth component of the present invention is one or more salts of alkaline earth metals. Addition of these salts to the resin composition maintains the physical properties, especially electrical properties, which degrade upon addition of melamine and melamine salts to the resin, while retaining the desired fire retardancy.

The alkaline earth salt component of the present invention includes salts that contain at least one cation taken from Group IIA of the Periodic Table. One alkaline earth metal salt can be used in the resin composition of the present invention, or a mixture of alkaline earth metal salts may be used. By mixture of alkaline earth metal salts is meant two or more salts having the same cation and different anions, the same anion and different cations, or different cations and different anions. A total amount of about 0.5% up to about 12% of alkali earth salts may be present in the resin composition. Preferred are calcium, barium, strontium or magnesium salts, with calcium carbonate, calcium sulfate, calcium hydrogen phosphate, calcium pyrophosphate, calcium hydroxide, barium hydroxide, barium pyrophosphate, barium metaborate, barium sulfate, strontium oxide, strontium hydroxide, strontium sulfate, strontium carbonate, strontium metaborate, magnesium sulfate and hydrotalcite more preferred; and strontium metaborate, barium metaborate, calcium hydrogen phosphate and calcium carbonate most preferred.

The compositions of the present invention described herein have excellent flame retardant characteristics and acceptable electrical properties. An important measure of the electrical properties of a resin composition is the Comparative Tracking Index (CTI). Tracking is defined as the formation of electrically conductive paths on the surface of an insulator between two electrodes caused either through pollution or degradation of the insulator. Tracking resistance is the ability of an insulator to prevent such currents.

CTI is measured by ASTM UL 746A which is a test method that indicates the relative resistance of solid electrical insulating materials to tracking for voltages up to 600 V when the surface is exposed under electric stress to water with the addition of contaminants. The test is made on a resin specimen that is at least 15×15 mm, with a thickness of greater than or equal to 3 mm, which has voltage applied across electrodes using solution A (ammonium chloride) as a contaminant. Tracking is considered to have occurred during the test procedure if a current of 0.5 A circulates for more than 2 seconds actuating an overcurrent relay. Failure also occurs if, while there is no current and the relay was not operated, the specimen is burning. CTI is the defined as the voltage at which no tracking occurs after 50 drops of solution A, provided that at 25 V or lower no tracking occurs after 100 drops of solution A.

Resin compositions that do not have good electrical properties typically have a CTI of about 300 V or lower. The resin compositions of the present invention unexpectedly have a CTI of ranging from about 350V to about 600V.

The compositions described herein have improved fire resistance and electrical properties compared to the resin alone, and are particularly useful as molding resins for making parts such as electrical and electronic parts such as bobbins, coil forms, connectors, fasteners, and for parts in equipment such as circuit breakers. These compositions also retain the good physical properties of the resins, that is, desirable mechanical properties particularly toughness. Toughness may be roughly estimated as being proportional to the product of the tensile strength and elongation, so the higher either or both of these are, the tougher the polymer. It is preferred that the composition be fire resistant enough so that it has a rating of V0 in the Underwriters Laboratory test UL-94, at a thickness of 0.08 cm (1/32 inch).

It is well known that lower levels of the flame retardants disclosed herein may be successfully used to prepare compositions which meet flame retardant tests less demanding than Underwriters Laboratory test UL-94. For example, lower amounts of the flame retardants of the present composition may be used in combination with a resin and a reinforcing agent and still pass the glow wire test under less demanding conditions, specifically at temperatures lower than 960° C. and/or at higher thicknesses than 1.5 mm. The glow wire test is International Standard IEC 695-2-1/0 1994.

It is preferred that the flame retardant, alkaline earth salt, reinforcing agent and optional ingredients, be relatively well dispersed in the resin. A preferred degree of dispersion can be attained by producing the composition in any of a number of different types of equipment which are commonly used to disperse materials in polymers. For instance, a twin screw extruder with appropriate mixing screw sections can be used to satisfactorily melt mix the ingredients. It is also believed that the dispersion of the optional charring catalyst in the polymer is aided by starting with melamine phosphate compounds having relatively small particle sizes.

It has also been discovered that the elongation of molded bars made from the inventive composition may be increased by adding to the composition a compatabilizer such as a silane compound. An example of an acceptable silane compound is triethoxy(3-aminopropyl) silane sold under the trade name A1100 by Aldrich Chemical Company of Milwaukee, Wis. The silane compound may be added to the composition by any conventional method. A preferred method is that the silane is first coated onto the melamine phosphate compound before the melamine phosphate compound is added to the other components of the inventive composition. Alternatively, the silane may be added to the resin and/or reinforcing agent, which is then mixed with the melamine phosphate compound.

The silane compound may be present in any amount up to about 0.4 weight percent, based on the total weight of the resin, reinforcing agent, flame retardant, alkaline earth metal salt and silane compound only. A preferred range is from 0.01 to 0.4 weight percent, and a more preferred range is from 0.1 to 0.3 weight percent.

A finely divided flame retardant component can have at least one outer coating of a material that covers the flame retardant and is compatible with any intended polymer to which it is added. Such coating compounds comprise organo silanes, such as alkyl silanes, amino silanes, mixtures of alkyl silanes and polysiloxanes; esters; polyols; dicarboxylic acids; aromatic or aliphatic dianhydrides; melamine formaldehyde; and mixtures thereof, as described in U.S. application Ser. No. 08/705,938, incorporated by reference herein.

In addition to the components discussed above, the compositions of this invention may contain additives commonly employed with synthetic resins, such as colorants, mold release agents, antioxidants, tougheners, nucleating agents, ultraviolet light stabilizers, and heat stabilizers, releasing agents, and the like. These ingredients are typically used in proportions of less than 1%.

A flow enhancer may be added to the composition to improve the flow. An example of an acceptable flow enhancer is dodecanedioic acid (DDDA), available from E.I. du Pont de Nemours and Company of Wilmington, Del. When a flow enhancer is used with the composition of the invention, it is preferred that the flow enhancer be used in an amount of from about 0.25 to about 0.5 weight percent, based only on the total weight percent of the resin, reinforcing agent, flame retardant composition, and alkaline earth metal salt. Other processing aids include pyromellitic dianhydride, or terephthalic acid.

Any of the ingredients used in the present invention may be coated. It is preferred that the melamine phosphate compounds be coated before use, as described above.

Although particular embodiments of the present invention are described herein, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

EXAMPLES

Abbreviations

| | |
|---|---|
| ACRA | Acrawax C |
| BABO | Barium metaborate, $Ba(B_2(OH)_4)_2$ or $BaB_2O_4 \cdot H_2O$ |
| CTI | Comparative Tracking Index |
| DDDA | Dodecanedioic acid |
| Elong | Elongation |
| FB500 | Firebrake ® 500 zinc borate |
| FR | Flame resistance |
| HDT | Hydrotalcite, a magnesium/aluminum carbonate mineral |
| MPP | melamine pyrophosphate |
| n/d | not determined |
| N66 | Zytel ® nylon 6,6 |
| PBT | polybutylene terephthalate |
| RDP | Resorcinol bis-diphenylphosphate |
| ST | Tensile strength |

Sources of Materials

ZYTEL® 101 nylon 6,6, RYNITE® 3934 polyester resins and DDDA were obtained from E.I. du Pont de Nemours and Company, Wilmington, Del.

PPG 3540 (used in all nylon examples) and PPG 3563 (used in all PBT examples) glass fiber reinforcing agents were obtained from PPG Industries, Pittsburgh Pa.

PBT was Valox 307 available from General Electric, Schenectady, N.Y.

MPP was purchased either from Cytek Industries Newark, N.J.), StanChem Inc., East Berlin, Conn., or Hummel Croton, South Plainsfield, N.J.

Acrawax C, an extrusion lubricant, was obtained from Lonza, Inc. Fairlawn, N.J.

Ba metaborate was obtained from Buckman Lab, Nashville, Tenn.

$BaSO_4$ was Blanc Fix from Sachtleben, Corp., New York, N.Y.

$CaCO_3$ was Omyacarb 15 from Omya, Inc., Proctor, Vt.

FB500 was obtained from US Borax, Valencia, Calif.

HDT HySafe 510 was obtained from Huber Specialty Chemicals, Havre de Grace, Md. HDT is $Mg_6Al_2(OH)_{16}(CO_3)_2$ with various amounts of $H_2O$.

RDP was FYROL Flex RDP from Akzo Nobel, Dobbs Ferry, N.Y.

The remainder of the compounds were obtained from Aldrich Chemicals, Milwaukee, Wis.

Underwriters' Laboratories UL-94 Flammability Test

A 5-inch by ½-inch (12.7 by 1.27 cm) molded bar, 1/32 inch (0.08 cm) in thickness for the nylon 6,6 composition and 1/16 inch (0.16 cm) in thickness for the polyester composition, was mounted vertically and flamed twice ($1^{st}$ and $2^{nd}$ application) and the duration of the each subsequent burning period measured. The test was made on five bars. A V-0 rating requires a total flaming time from the five tests to be less than 50 seconds, with no bar burning for more than 10 seconds and no ignition of a cotton pad placed below the bar due to melted and burning material. The full details for the testing procedure and the less stringent requirements for V-1 and V-2 ratings are detailed in the UL-94 Test Specifications.

Measurement of Electrical Resistance

CTI was measured using ASTM UL 746A, as previously described. In the tables below, "pass" indicates that the resin composition had a measured CTI of at least 350V.

Measurement of Strength and Elongation

Elongation and tensile strength were measured using ASTM D256.

Examples Procedure

Unless otherwise indicated, the following procedure was used in the examples. The resin used in the Examples was in the form of pellets. The resin and the other ingredients listed in the tables were thoroughly mixed, which usually took about 30 minutes. The resin mixture was then extruded on a 30 mm Werner & Pfleiderer twin screw extruder, using a screw design having a mid range screw severity, at a melt temperature of 299–330° C., and at rates of about 13.6 to about 18.2 kg per hour. Bars of 1/32 and 1/16 inch (0.08 and 0.16 cm) thick were molded on a 0.172 kg (6 oz) molding machine. Melt temperatures were typically 280–320° C., and mold temperatures were typically 45–120° C. The molded bars were then tested for a flammability rating in the UL-94 test at 0.08 cm thickness, unless otherwise indicated. All percentages are expressed as weight percents.

The MPP was coated with 0.75% weight relative to MPP weight. The MPP was placed in a plastic bag, the silane sprayed on as a fine mist. The bag was filled with nitrogen and shook vigorously to distribute the silane to all particles of MPP.

EXAMPLES 1–20

Zytel® 6,6 nylon was compounded with a variety of alkaline earth metal salts to demonstrate the ability of these salts to raise CTI to about 350V or above.

TABLE 1

| Ex. | N66 % | MPP % | ACRA % | DDDA % | Glass % | % | % | CTI | FR | ST, Kpsi (MPa) | EL % |
|---|---|---|---|---|---|---|---|---|---|---|---|
| 1 | 46.2 | 29.0 | 0.25 | 0.50 | 20.0 | CaCO$_3$, 4.0 | — | 375 | V-O | 16.3 (0.11) | 1.60 |
| 2 | 44.3 | 29.0 | 0.25 | 0.50 | 20.0 | Ca(OH)$_2$, 6.0 | — | 400 | V-O | 19.0 (0.13) | 2.1 |
| 3 | 44.5 | 29.0 | 0.25 | 0.25 | 20.0 | CaCO$_3$, 3.0 | BaBO, 3.0 | 450 | V-O | 21.9 (0.15) | 2.2 |
| 4 | 44.5 | 29.0 | 0.25 | 0.25 | 20.0 | HDT, 3.0 | SrO, 3.0 | 425 | V-O | 17.2 (0.12) | 1.75 |
| 5 | 43.5 | 30.0 | 0.25 | 0.25 | 20.0 | CaCO$_3$, 6.0 | — | 425 | V-O | n/d | 2.0 |
| 6 | 47.5 | 28.0 | 0.25 | 0.25 | 20.0 | Ca$_2$P$_2$O$_7$, 6.0 | — | 425 | V-O | 20.1 (0.14) | 2.2 |
| 7 | 44.5 | 29.0 | 0.25 | 0.25 | 20.0 | BaBO, 3.0 | Sr(OH)$_2$, 3.0 | 425 | V-O | n/d | n/d |
| 8 | 44.5 | 29.0 | 0.25 | 0.25 | 20.0 | Ca(OH)$_2$, 3.0 | BaBO, 3.0 | 425 | V-O | 17.4 (0.12) | 1.69 |
| 9 | 46.3 | 28.0 | 0.25 | 0.25 | 20.0 | BaBO, 5.2 | — | 450 | V-O | 20.6 (0.14) | 2.36 |
| 10 | 44.5 | 29.0 | 0.25 | 0.25 | 20.0 | Ca(OH)$_2$, 3.0 | BaBO, 3.0 | 425 | V-O | 18.9 (0.13) | 2.13 |
| 11 | 45.5 | 28.0 | 0.25 | 0.25 | 20.0 | BaBO, 3.0 | Ba(OH)$_2$, 3.0 | 450 | V-O | 21.2 (0.15) | 2.26 |
| 12 | 43.5 | 30.0 | 0.25 | 0.25 | 20.0 | Ca(OH)$_2$, 6.0 | — | 400 | V-O | 17.6 (0.12) | 1.72 |
| 13 | 46.5 | 28.0 | 0.25 | 0.25 | 20.0 | BaSO$_4$, 5.0 | — | 350 | V-O | 19.3 (0.13) | 2.03 |
| 14 | 46.5 | 28.0 | 0.25 | 0.25 | 20.0 | CaSO$_4$, 5.0 | — | 350 | V-O | 20.3 (0.14) | 2.18 |
| 15 | 46.5 | 28.0 | 0.25 | 0.25 | 20.0 | MgSO$_4$, 5.0 | — | 375 | V-O | 19.2 (0.13) | 1.80 |
| 16 | 47.5 | 28.0 | 0.25 | 0.25 | 20.0 | CaHPO$_4$, 6.0 | — | 400 | V-O | 19.2 (0.13) | 1.9 |
| 17 | 47.5 | 28.0 | 0.25 | 0.25 | 20.0 | Ba$_2$P$_2$O$_7$, 4.0 | — | 400 | V-O | 20.8 (0.14) | 2.52 |
| 18 | 45.4 | 28.0 | 0.25 | 0.35 | 20.0 | SrB$_2$O$_4$, 3.0 | CaSO$_4$, 3.0 | 450 | V-O | 19.0 (0.13) | 1.85 |
| 19 | 45.4 | 28.0 | 0.25 | 0.35 | 20.0 | SrB$_2$O$_4$, 3.0 | CaCO$_3$, 3.0 | 450 | V-O | 19.3 (0.13) | 1.75 |
| 20 | 45.4 | 28.0 | 0.25 | 0.35 | 20.0 | SrSO$_4$, 2.0 | SrCO$_3$, 4.0 | 400 | V-O | 18.9 (0.13) | 1.82 |

EXAMPLES 21–23 AND COMPARATIVE EXAMPLE A

PBT was compounded as described above, with the addition of RDP, a plasticizer which helps with elongation and additional flame retardant, and 0.5% mold releasing agents. PPG 3563 glass fiber was used as the reinforcing agent. Comparative Example A was run as a control without addition of an alkaline earth metal salt, and had a measured CTI of less than 350V. Results are shown in Table 2.

TABLE 2

| Ex. | PBT % | MPP % | RDP % | Glass % | % | % | CTI | FR |
|---|---|---|---|---|---|---|---|---|
| 21 | 38.7 | 29.0 | 7.0 | 20.0 | CaCO$_3$, 5.0 | — | Pass | V-O |
| 22 | 40.0 | 31.0 | 7.0 | 20.0 | HDT, 1.5 | — | Pass | V-O |
| 23 | 35.0 | 31.0 | 7.0 | 20.0 | HDT, 0.5 | BaSO$_4$, 6.0 | Pass | V-O |
| A | 39.5 | 33.0 | 7.0 | 20.0 | — | — | Failed (325 V) | V-O |

EXAMPLE 24 AND COMPARATIVE EXAMPLES B AND C

Two resin compositions were prepared using similar conditions to demonstrate the advantages when alkaline earth metal salts are used instead of zinc salts to enhance CTI. The compositions were run on a 58 mm Werner & Pfleiderer twin screw extruder.

A 58 mm extruder is considered commercial scale whereas a 30 mm extruder is considered lab scale. The run conditions for the two machines are comparable. When Example B was run on a 30 mm extruder, the mechanical properties were poor (elongation was about 1.5%, strength about 16.5 kpsi) and excessive foaming occurred when the conditions were not optimal. Optimal conditions mean running at about 15 lbs/hr instead of 30 lbs/hr, a standard lab scale rate.

Comparative Example B, containing zinc borate, had excessive foaming and spitting at the exit die while processing at 200–500 pounds/hour (phr) to such an extent that it was impossible to test for CTI, FR, ST, or elongation, whereas Example 24, containing barium sulfate, ran flawlessly at 500 phr for 7 hours. Comparative Example C, containing ZnO, was processable, but did not pass the flame retardancy test at V-O but passed the lesser rating of V-2. Results are shown in Table 3.

TABLE 3

| Ex. | N66 % | MPP % | ACRA % | DDDA % | Glass % | % | CTI | FR | ST, Kpsi (MPa) | EL % |
|---|---|---|---|---|---|---|---|---|---|---|
| 24 | 46.4 | 28.0 | 0.23 | 0.3 | 20 | BASO$_4$, 5.0 | Pass | V-O | 20 (0.14) | 2.3 |
| B | 46.6 | 29.0 | 0.23 | 0.3 | 20 | FB500, 3.8 | — | — | — | — |
| C | 47.5 | 28.0 | 0.25 | 0.25 | 20 | ZnO, 4.0 | Pass | V-2 | 18.0 (0.13) | 1.6% |

What is claimed is:

1. A composition comprising:
   (a) about 30 to about 70 weight percent of a polyester or a synthetic, aliphatic polyamide, or a mixture thereof;
   (b) about 15 to about 40 weight percent of a reinforcing agent;
   (c) about 5 to about 45 weight percent of a flame retardant comprising at least one melamine phosphate compound selected from the group consisting of melamine phosphate, melamine polyphosphate, and melamine pyrophosphate;
   (d) about 0.5 to about 12 weight percent of one or more salts of one or more alkaline earth metals;
   wherein all percents by weight are based on the total weight of (a)+(b)+(c)+(d) only, and wherein said composition has a Comparative Tracking Index ranging from about 350V to about 600V.

2. The composition of claim 1 wherein the alkaline earth metal is calcium, barium, strontium, or magnesium.

3. The composition of claim 2 wherein the alkaline earth metal salt is selected from the group consisting of: calcium carbonate, calcium sulfate, calcium hydrogen phosphate, calcium pyrophosphate, calcium hydroxide, barium hydroxide, barium pyrophosphate, barium metaborate, barium sulfate, strontium oxide, strontium hydroxide, strontium sulfate, strontium carbonate, strontium metaborate, magnesium sulfate and hydrotalcite.

4. The composition of claim 3 wherein the alkaline earth metal salt is selected from the group consisting of: barium metaborate, strontium metaborate, calcium hydrogen phosphate and calcium carbonate.

5. The composition of claim 1 wherein the polyamide is selected from the group consisting of nylon-6,6, nylon-6 and copolymers thereof.

6. The composition of claim 1 wherein said reinforcing agent is glass, carbon, mica, aramid fibers or mixtures thereof.

7. The composition of claim 1 wherein the flame retardant or melamine phosphate compound has at least one coating selected from the group consisting of silane, ester, dianhydride, dicarboxylic acid, and mixtures thereof.

8. The composition of claim 1 wherein the flame retardant further comprises at least one from the group consisting of: up to 10 weight percent of a charring catalyst, up to 10 weight percent of a char former, up to 10 weight percent of melamine, and up to 10 weight percent of melamine cyanurate.

* * * * *